US006723162B1

(12) United States Patent
Cheyrezy et al.

(10) Patent No.: US 6,723,162 B1
(45) Date of Patent: Apr. 20, 2004

(54) CONCRETE COMPRISING ORGANIC FIBRES DISPERSED IN A CEMENT MATRIX, CONCRETE CEMENT MATRIX AND PREMIXES

(75) Inventors: Marcel Cheyrezy, Sevres (FR); Jerome Dugat, Montigny le Bretonneux (FR); Sandra Boivin, L'Isle d'Abeau (FR); Gilles Orange, Soisy sous Montmorency (FR); Laurent Froin, L'Hay les Roses (FR)

(73) Assignees: Bouygues, Saint Quentin (FR); Lafarge, Paris (FR); Rhodia Chimie, Courbevoie (FR)

( * ) Notice: Subject to any disclaimer, the term of this patent is extended or adjusted under 35 U.S.C. 154(b) by 0 days.

(21) Appl. No.: 09/700,388
(22) PCT Filed: May 12, 1999
(86) PCT No.: PCT/FR99/01145
§ 371 (c)(1),
(2), (4) Date: Mar. 16, 2001
(87) PCT Pub. No.: WO99/58468
PCT Pub. Date: Nov. 18, 1999

(30) Foreign Application Priority Data

May 14, 1998 (FR) .............................. 98 06092

(51) Int. Cl.$^7$ .............................................. C04B 14/38
(52) U.S. Cl. ...................................... 106/644; 106/724
(58) Field of Search ............................... 106/724, 644

(56) References Cited

U.S. PATENT DOCUMENTS 3,501,323 A 3/1970 Moorehead et al.
3,969,567 A 7/1976 Occleshaw et al.
4,101,335 A 7/1978 Barrable
4,111,711 A 9/1978 Kiehl et al.

(List continued on next page.)

FOREIGN PATENT DOCUMENTS

| EP | 0 010 777 | 5/1980 |
| EP | 0 033 796 | 8/1981 |
| EP | 0 047 158 | 3/1982 |
| EP | 0 068 762 | 1/1983 |
| EP | 0 127 960 | 12/1984 |
| EP | 0 220 649 | 5/1987 |
| EP | 0 225 932 | 6/1987 |
| EP | 0 263 723 | 4/1988 |
| EP | 0 718 252 | 6/1996 |
| FR | 2 704 853 | 11/1994 |
| GB | 2 259 700 | 3/1993 |
| WO | WO 87/07597 | 12/1987 |
| WO | WO 94/04330 | 3/1994 |
| WO | WO 95/01316 | 1/1995 |
| WO | WO 95/21050 | 8/1995 |

OTHER PUBLICATIONS

B. Magyari et al., Chemical Abstracts, vol. 112, No. 22, May 28, 1990, Columbus, Ohio, U.S.; abstract No. 203792p, p. 330; XP000156863.

(List continued on next page.)

Primary Examiner—Paul Marcantoni
(74) Attorney, Agent, or Firm—Young & Thompson

(57) ABSTRACT

A concrete includes organic fibers, dispersed in a cement matrix. The cement matrix includes elements having predetermined particle sizes. The organic fibers have predetermined lengths and diameters. The behavior of the concrete is improved both with respect to the occurrence of minute cracks and the propagation of large cracks as a result of a synergistic effect between the cement matrix and the organic fibers.

33 Claims, 9 Drawing Sheets

Typical direct tensile stress curve of a concrete having a ductile feature

U.S. PATENT DOCUMENTS

| | | | |
|---|---|---|---|
| 4,261,754 A | | 4/1981 | Krenchel et al. |
| 4,482,385 A | | 11/1984 | Satkowski et al. |
| 4,588,443 A | | 5/1986 | Bache |
| 4,637,860 A | | 1/1987 | Harper et al. |
| 4,668,548 A | | 5/1987 | Lankard |
| 4,780,141 A | | 10/1988 | Double et al. |
| 4,979,992 A | | 12/1990 | Bache |
| 4,999,056 A | | 3/1991 | Rasmussen |
| 5,106,557 A | | 4/1992 | Rirsch et al. |
| 5,108,679 A | | 4/1992 | Rirsch et al. |
| 5,234,754 A | * | 8/1993 | Bache et al. ............... 428/332 |
| 5,447,564 A | * | 9/1995 | Xie et al. .................. 106/644 |
| 5,545,297 A | | 8/1996 | Andersen et al. |

OTHER PUBLICATIONS

H. Kuboi et al., Chemical Abstracts, vol. 114, No. 4, Jan. 28, 1991, Columbus, Ohio, US; abstract No. 29129g, p. 315, XP000188168.

T. Sakurai et al., Chemical Abstracts, vol. 114, No. 8, Feb. 25, 1991, Columbus, Ohio, US; abstract No. 6804–3u, p. 379, XP000192666.

T. Takada et al., Chemical Abstracts, vol. 114, No. 4, Feb. 8, 1993, Columbus, Ohio, U.S.; abstract No. 44482t, p. 362, XP000352498.

Barr, B. and Al–Oraimi, S.K.A. (1994), Fracture Energy of Concrete In: *Brittle Matrix Composites* 4 (Eds, A.M. Brandt, V.C. Li and I.H. Marshall). Woodhead Publishing Limited, Cambridge. 81–90.

Kucharska,L., Logon D. (1997) the influence of Fly Ash on Rheological and Mechanical Properties of Cement Mortars Reinforced With Pitch–Based Carbon Fibers In: *Brittle Matrix Composites* 5. (Eds. A.M. Brandt, V.C.Li and I.H. Marshall). Woodhead Publishing Limited, Cambridge, 113–122.

Li, V.C. and Leung, C.K.Y. (1992) Theory of Steady State and Multiple Cracking of Rand discontinuous Fiber Reinforced Brittle Matrix Composites. *ASCE J. Eng. Mechanics*, 118, (11), 22 2264.

Li, V.C. and Wu, H.C. (1992) Conditions for Pseudo Strai–Hardening in Fiber Reinforced Brittle Matrix Composites, *J. Applied Mechanics Review*, 45 (8) 390–398.

Li, V.C. and Stang, H. (1997) Interface Property Characterization and Strengthening Mechanisms in Fiber Reinforced Cement Based Composites. *Advanced Cement Based Materials*, 6, (1), 1–20.

Rongxi, S. and Ruishan, Y. (1989) PVA Fibre Reinforced Cement Sheets: Production and Properties. In: *Fibre Reinforced Cements and Concretes. Recent Developments* (Eds.: R.N. Swamy and B. Barr). Elsevier Science Publishers Ltd. England. 80–89.

Shao Y., Marikunte S. and Shah S.P. (1995) Extruded Fiber–Reinforced Composites. *Concrete Int*. 17, 48–52.

Tomatsuri, K. and Nagase, K. (1989). Application of High Strength Cement and Carbon Fiber Composite. In: *Brittle Matrix Composites* 2. (Eds, A.M. Brandt and I.H. Marshall). Elsevier Science Publishers, England 393–402.

* cited by examiner

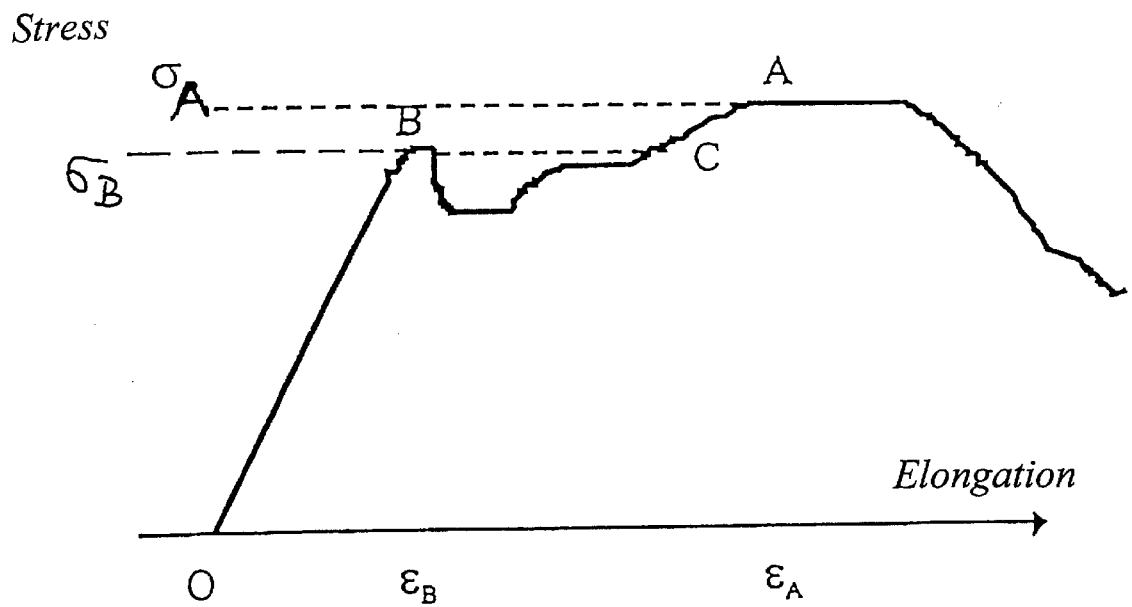
Figure 1 : Typical direct tensile stress curve of a concrete having a ductile feature

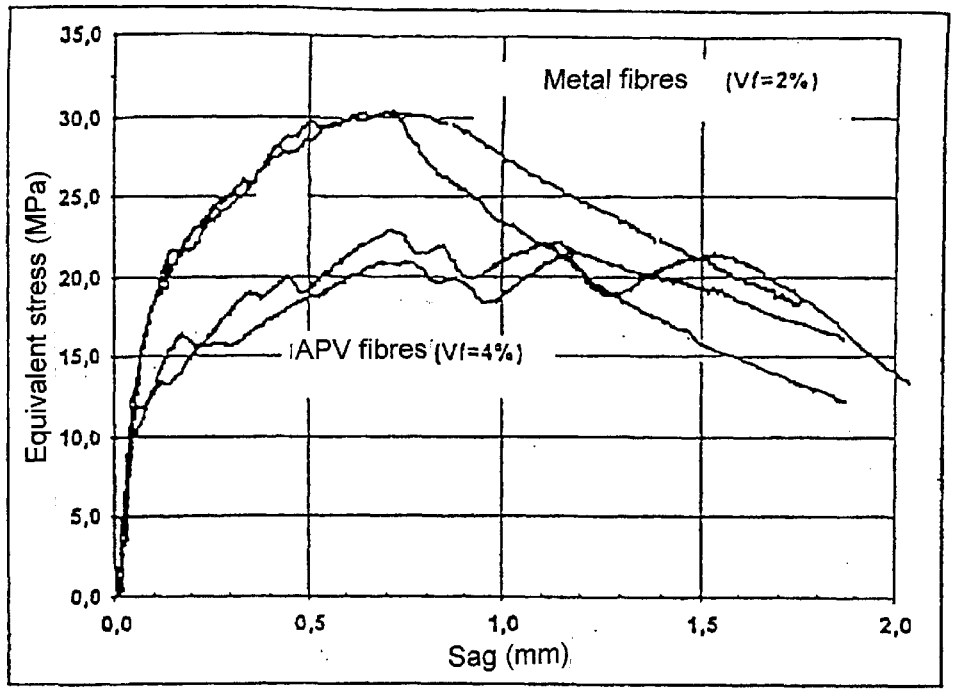
Figure 2 : 4 point bending. Comparison between APV fibres and steel cords in a concrete matrix e/c = 0.2 – Maturing : 20°C/28 days
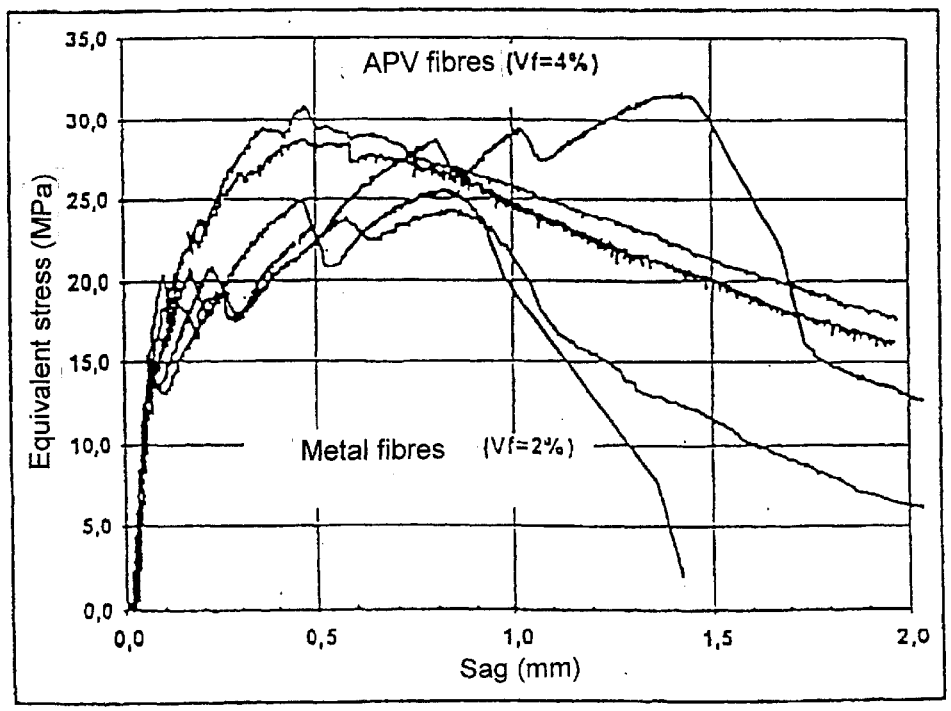
Figure 3 : 4 point bending. Comparison between APV fibres and steel cords in a concrete matrix e/c = 0.2 – Thermal treatment : 90°C/48 hours

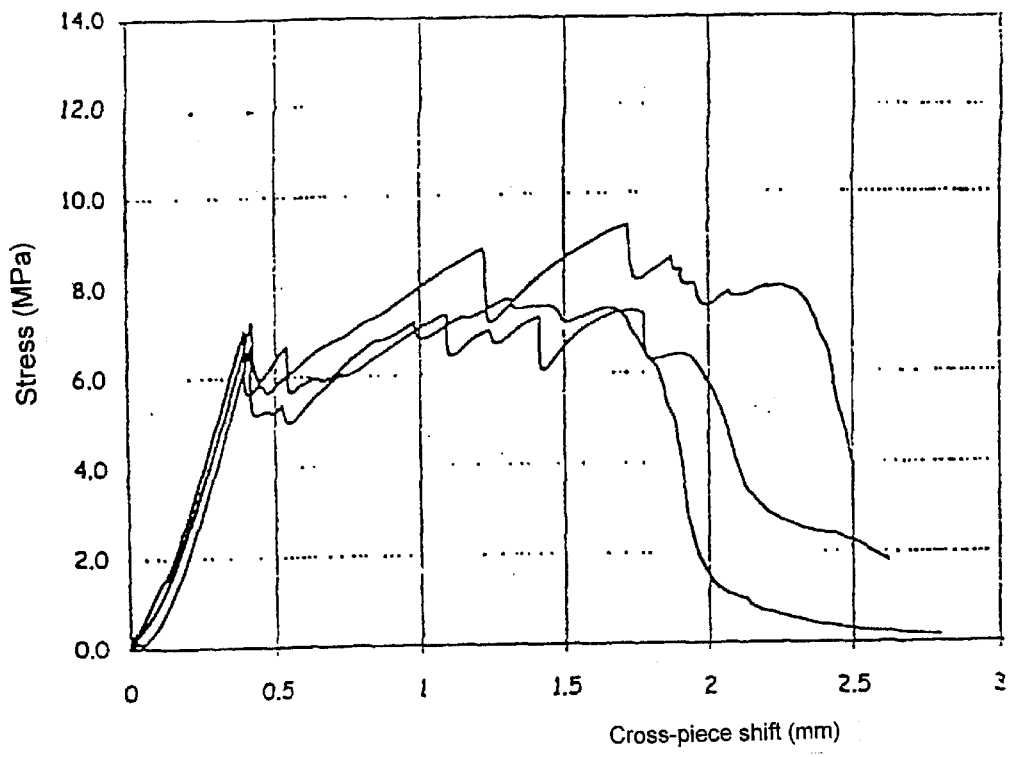
Figure 4 : Direct tensile stress. Concrete reinforced with 4% vol. APV fibres
e/c = 0.2 – Maturing : 20°C/28 days
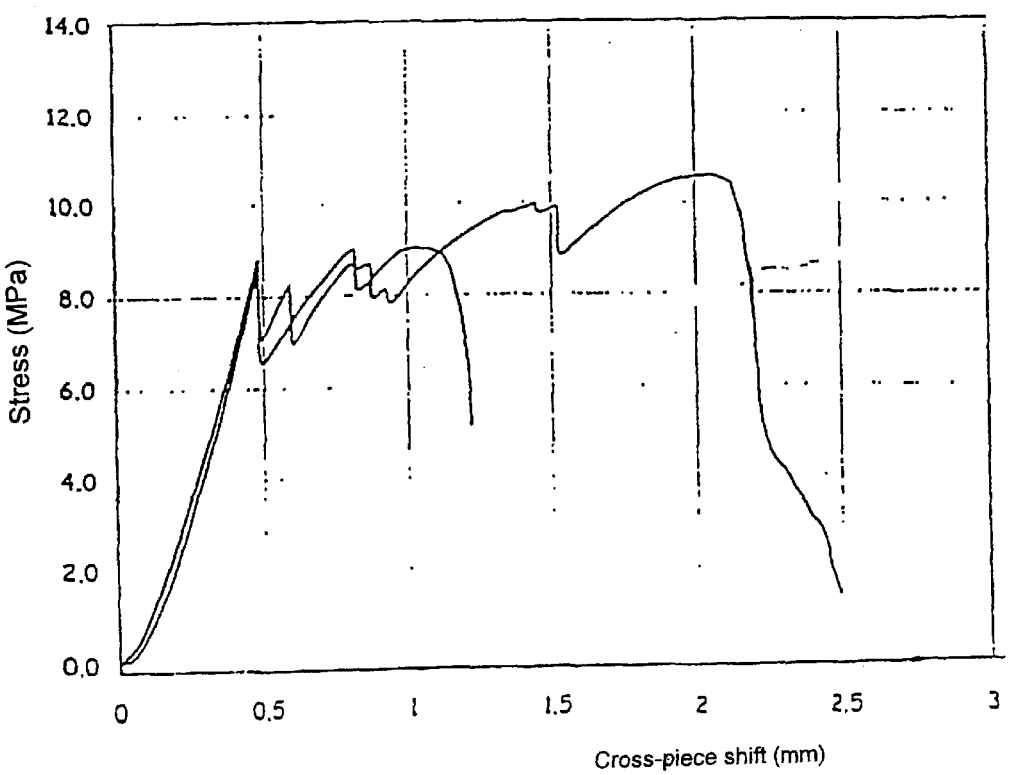
Figure 5 : Direct tensile stress. Concrete reinforced with 4% vol. APV fibres
e/c = 0.2 – Thermal treatment : 90°C/48 hours

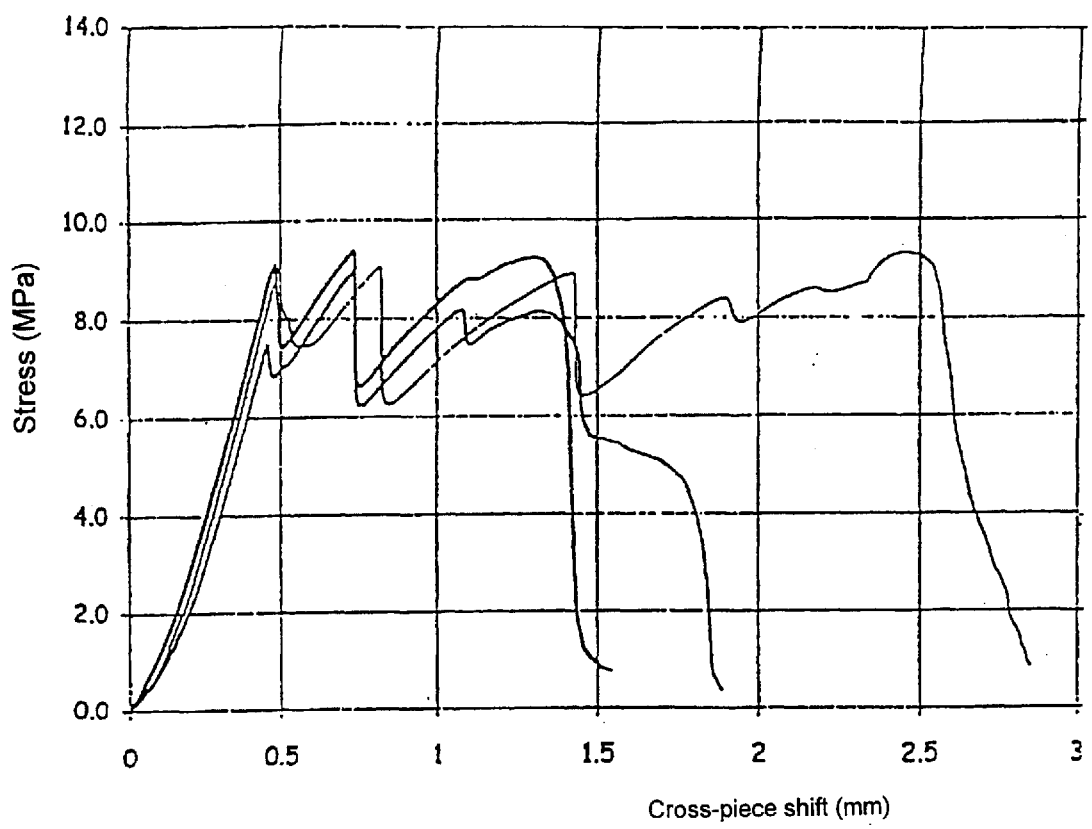
Figure 6 : Direct tensile stress. Concrete reinforced with wollastonite and 4% vol. APV fibres e/c = 0.24 — Maturing : 20°C/28 days

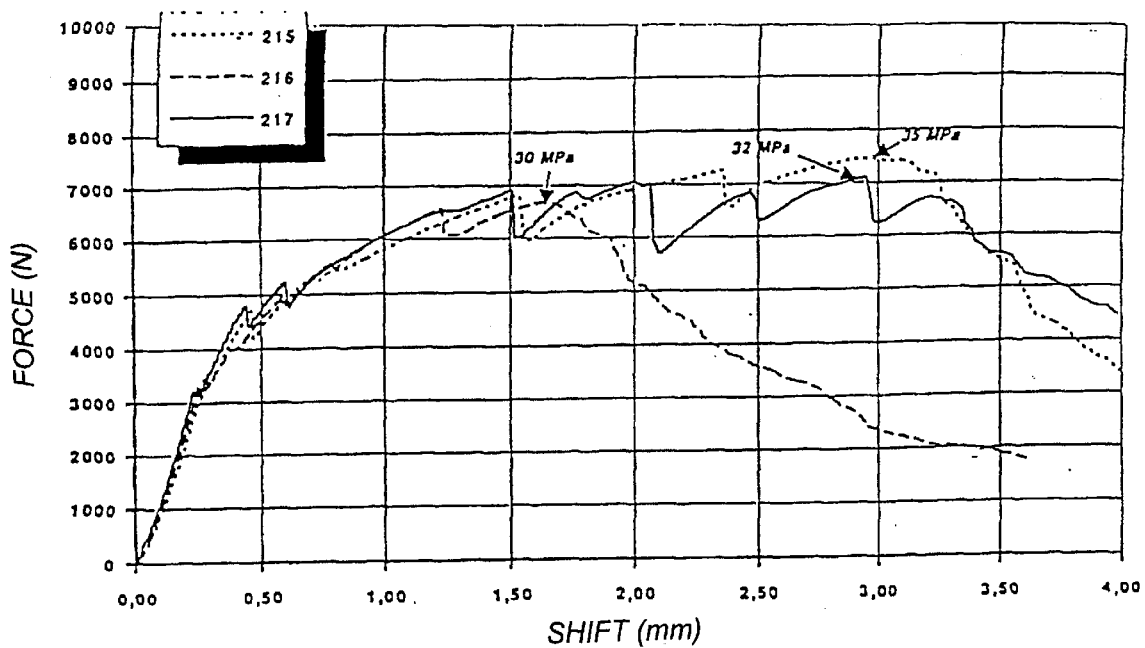
Figure 7 : 3 point bending. Concrete matrix reinforced with 4% vol. APV fibres. e/c = 0.25 – Thermal treatment : 90°C/48 h
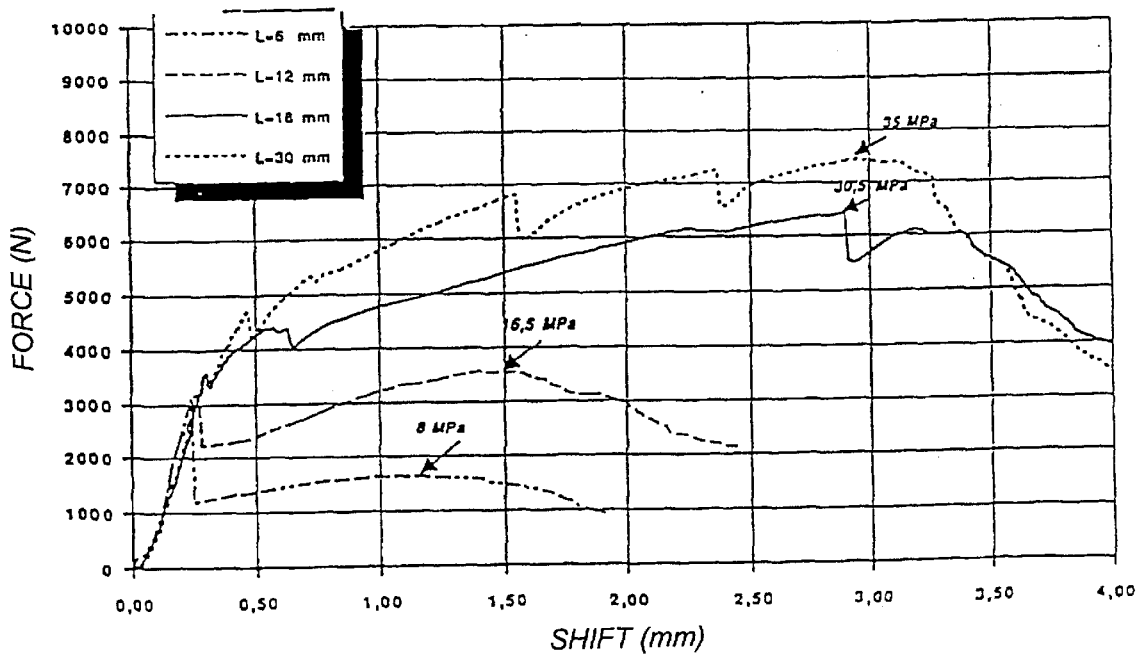
Figure 8 : 3 point bending. Concrete matrix reinforced with 4% vol. APV fibres. Effect of the APV fibre length e/c = 0.25 – Thermal treatment : 90°C/48 h

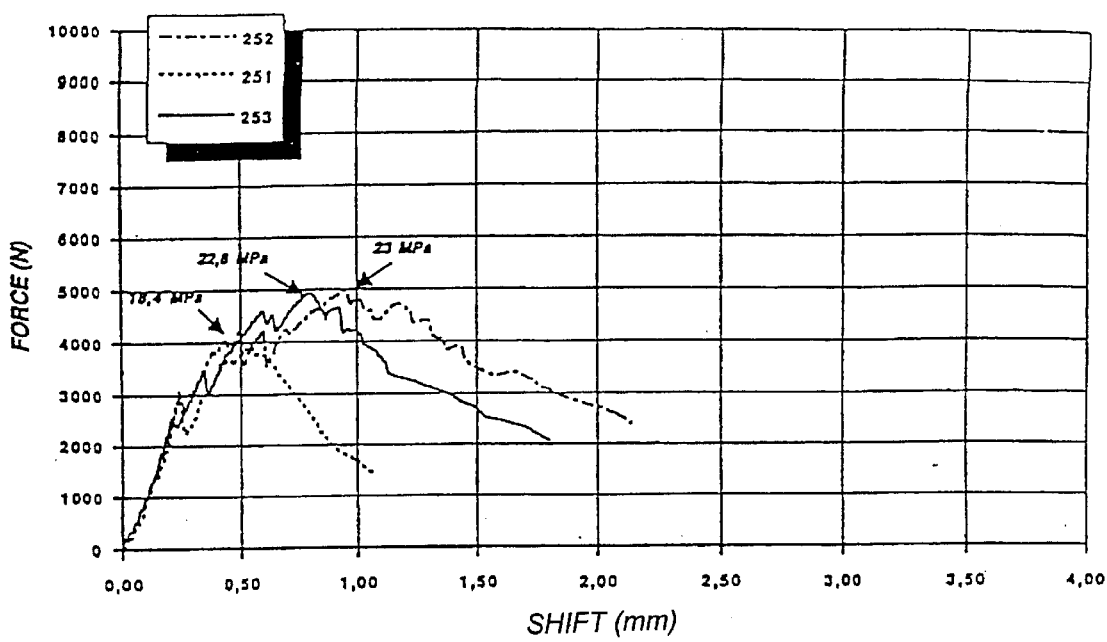
Figure 9 : 3 point bending. Concrete matrix reinforced with 1% vol. PEHD fibres. e/c = 0.25 – Thermal treatment : 90°C/48 h
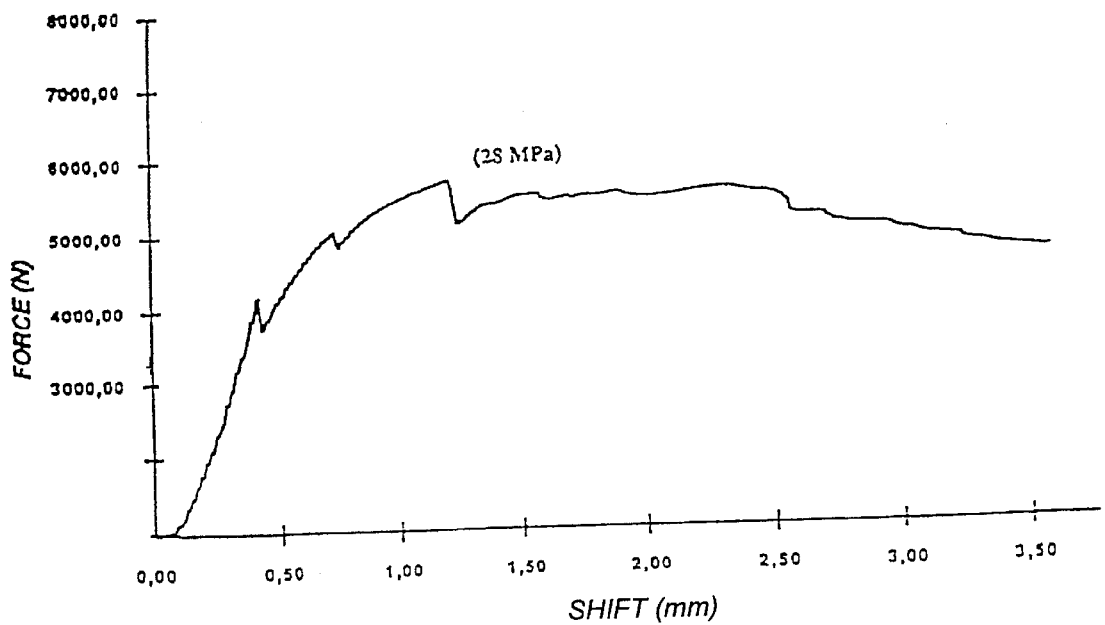
Figure 10 : 3 point bending. Effect of a blend of organic fibres. Concrete matrix reinforced with 4% vol. APV fibres : 2% vol. 1500 and 2% vol. 4000. e/c = 0.25 – Thermal treatment : 90°C/48 h Force-shift curves : pull-out tests.

APV : critical constraint > 8 MPa (thread breaking after an important plastic deformation).
PA : critical constraint = 2.8 MPa (slide).

CONCRETE COMPRISING ORGANIC FIBRES DISPERSED IN A CEMENT MATRIX, CONCRETE CEMENT MATRIX AND PREMIXES

This invention relates to a new fiber concrete allowing to make structure components and having better properties than those of the prior art components, in particular with respect to the tensile stress behaviour (bending and direct tensile stress). The fibres being used are organic fibres.

A structural analysis of concrete has shown that their mechanical properties are closely linked to the presence of structural defects. Many types of structural defects can be observed in these concrete mixes when they are subject to mechanical loads. They differentiate from each other with their size.

At the lowest scale, the so-called microporosity defect of the concrete is observed, that means so-called capillary pores, derived from intergranular spaces initially present in the fresh paste. Their size lies in the range from 50 nanometers to a few micrometers.

At an intermediary scale, microcrack defects are observed. These are microcracks having openings in the range between 1 and 100 micrometers. These are non coalescent, i.e. they do not form a continuous path through the structure. These are essentially due to the heterogeneous character of concrete, the granulates having mechanical and physical properties different from those of the binder/cement. They occur upon mechanical loading. This defect type is mainly responsible for the poor mechanical tensile stress properties of concrete and its breakable character.

At the upper scale, macrocrack defects are observed. The crack opening varies from 100 $\mu$m to 1 mm. These cracks are coalescent.

Millimetric size major defects may also be observed which are due to a wrong concrete preparation (occluded air, filling defects).

Solutions have been proposed either to reduce the presence of these various defects or to attenuate their effects.

Thus, it has been possible to partially control microporosity by reducing the water/cement weight ratio and using fluidizing agents. The use of fine fillers, in particular with a pozzolanic reaction, has also made it possible to reduce the micropore size.

As far as microcracking is concerned, it has been strongly reduced:
 by improving the concrete homogeneity, for example, by reducing the granulate size to 800 $\mu$m,
 by improving the material compactness (granular optimization and optional pressing before and during setting), thermal treatments after setting.

As to microcracking, it has been controlled by the use of metal fibres.

WO-A-95/01316 can be mentioned as prior art document. It relates to controlling the size ratio between the metal fibres and the granular elements (sand, granulates). This improved fibre concrete comprises cement, granular elements, fine elements with pozzolanic reaction and metal fibres. The granular elements must have a maximum grain size D of 800 micrometers at the most, the fibres must have an individual length I in the range between 4 mm and 20 mm and the ratio R between the average length L of the fibres and D should at least equal 10.

The resulting concrete shows a flexural ductile behaviour or pseudo cold working.

Concrete or mortar formulations comprising organic fibres have also been suggested for various purposes, optionally conjugated with metal fibres, as disclosed, for example, in the publication "Fibre reinforced cementitious composites" by A. BENTUR, S. MINDESS (Elsevier Applied Science, 1990).

The state of the art shows that the man skilled in the art who aims at formulating a fibre concrete faces multiple possible choices of materials and proportions, as well as regards the concrete cement matrix than the fibres, so that the problem still remains that a concrete is to be formulated having improved properties compared to existing concrete mixes and the cost of which is not to be redhibitory for its efficient use in the building industry and public works.

An answer to the aimed properties is to be found at the level of the use of organic fibres instead of metal fibres: increase in ductility, in particular tensile stress, reduction of corrosive effects, weight reduction of fibre concrete structures. A less important attenuation of the radioelectric signals can also be mentioned.

An interesting effect provided by the presence of polymer type reinforcing fibres is an improved fire behaviour of the fibre concrete mixes.

Another further solution is to be found at the level of the elimination of the above-mentioned defects, more particularly microcracks, because it has been observed that the implementations described in the prior art are mainly designed to avoid the development of macrocracks and not of microcracks: the microcracks are not stabilized and develop under stress.

The object of the present invention is a concrete mix comprising reinforcing organic fibres and having improved properties compared to the prior art concrete mixes, more particularly in tensile stress (flexion and direct tensile stress).

Another aim of the present invention is to provide a concrete mix the cold working of which is improved beyond the first damage by controlling the macrocrack propagation. The invention aims thus at increasing the field of use of concrete beyond the first damage by providing a ductile behaviour to concrete.

FIG. 1 of the accompanying drawings is a typical direct tensile stress curve of a concrete mix with a ductile nature according to the prior art.

In the case of a break being not of the breakable type (breakable means here that break is sudden, not progressive), both the engineer designing a structure and the engineer who calculates it or must check its safety, needs to have access to the behaviour law of the material or to a feature that shows it. The material ductility only corresponds to the non elastic strain occurring, in direct tensile stress, before the constraint peak A.

In order to illustrate the advantage of ductility, one can merely imagine the behaviour of a tie-rod (a strut for example built-in at its upper end), subjected to an increasing tensile load (weights being added to the lower end). As soon as this load has reached the peak value, a break occurs and is complete (in the direct tensile stress test, in particular, the post-peak portion can only be seen if the test is carried out upon stress).

The ductility of a non elastic material is characterized by the whole stress-strain curve in a simple tensile stress, but considered only up to the peak. It can also be defined as being the ratio of the breaking stress $\epsilon_A$ to the elastic stress $\epsilon_\epsilon 1 = \epsilon_B \cdot (\sigma_A/\sigma_B)$ corresponding to the breaking stress (provided $\sigma_A$ is higher than ($\sigma_B$); this ratio is equal to that of the elastic modulus (OB slope) divided by the secant modulus at break (peak stress divided by peak strain or OA slope).

The ductility may be described by means of a ductility coefficient δ:

$$\delta = \frac{\epsilon_A \cdot \sigma_B}{\epsilon_B \cdot \sigma_A}$$

where $\epsilon_A$=peak strain, and $$\epsilon_{el} = \epsilon_B \cdot \frac{\sigma_A}{\sigma_B}$$

with $\epsilon_{el}$=strain that would be obtained under peak stress by elastically extrapolating the resulting strain under the running stress.

This definition is perfectly in line with the physical behaviour observed on a test specimen (multicracking): upon the first cracking, the so-called first crack peak B (which is only a local or partial maximum), is locally reached followed by an opening that can be read on FIG. 1 between first peak B and the point C where the curve goes beyond the value of this peak; at this time, the first crack is stabilized because stress again increases in the whole stressed volume until the occurrence of a second crack, etc. This behaviour is strong, as it can only be more stable in higher size volumes.

Another aim of the present invention is to increase the stress level where the first concrete damage occurs (i.e. microcracks) and thereby to extend the field of use for the concrete (elastic linear behaviour).

Still another aim of the invention is to improve, by a synergistic effect between the cement matrix and the organic fibres, the behaviour of the concrete both with respect to the occurrence of microcracks and the propagation of macrocracks.

The aims of the invention have been found to be reached with a concrete that combines a cement matrix with determined features and organic fibres also with determined features.

More precisely, generally speaking, the invention aims a concrete comprising a hardened cement matrix in which organic fibres are dispersed, obtained by blending with water a composition containing besides organic fibres:

(a) cement,
(b) granular elements with a maximum grain size D of 2 mm at the most, preferably 1 mm at the most,
(c) fine elements with a pozzolanic reaction having an elementary particle size of 20 μm at the most, preferably 1 μm at the most,
(d) at least a dispersing agent, and satisfying the following conditions:
  (e) the weight percentage of water E to the added weight of cement (a) and elements (c) is in the range between 8% and 25%,
  (f) the fibres have an individual length I of at least 2 mm and a I/φ ratio, Φ being the fibre diameter, of at least 20,
  (g) the ratio R between the average fibre length L and the maximum grain size D of the granular elements is at least 5,
  (h) the fibre amount is such that their volume represents 8% at the most of the concrete volume after setting.

Thus, with a new design of the granular skeleton and its relationship with the reinforcing fibres, this solution solves the problem encountered with this compromise between mechanical properties and rheology.

The concrete properties according to the invention are not substantially modified, if within the matrix, granular elements (b) are also used, with a grain size exceeding 2 mm, but in a proportion not exceeding 25% of the volume of all the components (a)+(b)+(c).

The presence of this granular class in such a proportion may be considered as a filler that does not take part in the mechanical performances of the material in so far as:

the grain size D50 of all the components (a), (b) and (c) is 200 μm at the most, preferably 150 μm at the most, and the ratio R between the average fibre length L and the grain size D 75 of all the components (a), (b) and (c) is at least 5, preferably at least 10.

By grain size D75 and D50, it is to be understood the sieve sizes the passing through part respectively represents 75% and 50% of the total grain volume.

The invention therefore also relates to a concrete comprising a hardened cement matrix in which organic fibres are dispersed, obtained by blending with water a composition containing besides organic fibres:

(a) cement,
(b) granular elements,
(c) elements with a pozzolanic reaction having an elementary particle size of 1 μm at the most, preferably 0.5 μm at the most,
(d) at least a dispersing agent, and satisfying the following conditions:
  (1) the weight percentage of water E to the added weight C of cement (a) and elements (c) is in the range between 8% and 24%,
  (2) the fibres have an individual length I of at least 2 mm and a I/Φ ratio, Φ being the fibre diameter, of at least 20,
  (3) the ratio R between the average fibre length L and the grain size D75 of all the granular elements (a), (b) and (c) is at least 5, preferably at least 10,
  (4) the fibre amount is such that their volume represents 8% at the most of the concrete volume after setting,
  (5) the whole elements (a), (b) and (c) have a grain size D75 of 2 mm at the most, preferably 1 mm at the most, and a grain size D50 of 150 μm at the most, preferably 100 μm at the most.

The conditions (3) and (5) apply to all solid elements (a), (b) and (c) together, without fibres, and not for each element taken individually.

In an alternative, a portion of the organic fibres is substituted for by metal fibres: a "hybrid" composite is thereby obtained the mechanical behaviour of which may be adapted depending upon the required performances (elastic and cold working portion/post-peak portion).

The presence of organic fibres makes it possible to modify the concrete fire behaviour as previously defined.

In fact, the melting nature of said fibres makes it possible to develop pathways through which steam or water under pressure can escape upon a strong increase of temperature.

The organic fibres may be i.a. selected amongst polyvinyl alcohol fibres (APV), polyacrylonitrile fibres (PAN), polyethylene fibres (PE), high density polyethylene fibres (PEHD), polypropylene fibres (PP), homo- or copolymers, polyamide or polyimide fibres, aramid fibres or carbon fibres as well. Mixtures of these fibres can also be used. The reinforcing fibres used according to the invention may be selected amongst the various available fibres on the market and being classified in one of the three following categories: high modulus non reactive fibres, low modulus non reactive fibres and reactive fibres. The following illustrative examples relate, amongst others, to the non reactive PEHD fibres, the modulus of which is higher than that of the concrete matrix, the non reactive polyamide fibres (PA), the modulus of which is lower than that of the concrete matrix and the APV fibres reacting with the concrete matrix.

The "hybrid" reinforcing elements may be produced by combining fibres of various natures and/or lengths. The following illustrative examples more particularly relate to short APV organic fibres (6 mm) and long metal fibres (13 mm) and show that a considerable reinforcing synergistic effect is then obtained. Other examples of similar combinations are the following:

APV or PEHD short fibres (6 mm) and APV long fibres (20 mm), short steel cords (5 mm) and APV long fibres (20 mm).

These organic fibres may have the form of an object made either as a monostrand or multistrands, the object diameter being in the range from 10 µm to 800 µm. The organic fibres may also be used in the form of woven or non woven structures or of a hybrid strand (filament blend).

The individual length of the organic fibres is preferably in the range between 5 mm and 40 mm.

The fibre amount is such that their volume is lower than 8% and preferably lower than 5% of the concrete volume after setting.

The l/φ ratio, φ being the fibre diameter, is at least 20 and preferably 500 at the most.

The tests have shown that even a fibre amount leading to a volume as low as 1% could be efficient, taking the matrix formulation into account, but that this value should not be considered as a limit value.

In fact, the useful dosages strongly depend upon the fibre geometry, their chemical nature and their intrinsic mechanical properties (elastic modulus, flowing threshold, mechanical strength).

Using fibre blends having different features allows to adapt the concrete properties with respect to the desired features.

Advantageously, the average adherence stress of the fibres in the cement matrix must be at least 2 MPa, preferably at least 5 MPa, depending on the fibre nature.

This stress is determined by an extraction trial for a monofibre being embedded within a concrete block, as described hereafter.

The fibre/matrix adherence level may be controlled using several methods which can be made individually or simultaneously.

The fibre adherence in the cement matrix can be obtained by reactivity between the fibre and the cement matrix, which can be enhanced with thermal treatments carried out on concrete (cure) or with fibre surface treatments.

According to a second method, the fibre adherence stress in the cement matrix can be obtained by including into the composition at least one of the following compounds: silica compounds comprising essentially silica, precipitated calcium carbonate, aqueous solution of polyvinyl alcohol, phosphates, latexes, a surfactant (defoaming agent, wetting agent or the like) or a blend of said compounds.

By silica compounds comprising essentially silica, it is meant synthesis products selected amongst precipitated silicas, silica sols, pyrogenation silicas (aerosil type), silico-aluminates, for example Tixosil 28 marketed by RHODIA Chimie, or the products obtained through etching natural products of clay type: smectites, magnesium silicates, sepiolites, montmorillonites.

Preferably, at least one precipitated silica is used.

By precipitated silica, it is meant a silica obtained by precipitation from the reaction of an alkaline metal silicate with an acid, usually inorganic, at a suitable pH of the precipitation medium, particularly a basic, neutral or little acidic pH.

Usually, the precipitated silica amount being introduced is comprised in the range from 0.1% to 5% in dry weight with respect to the concrete total composition. Beyond 5%, rheology problems are usually observed in preparing concrete.

The precipitated silica is preferably introduced into the composition as an aqueous suspension. It can more particularly be an aqueous silica suspension having:

a dry matter content in the range between 10% and 40% by weight, a viscosity lower than $4.10^{-2}$ Pa·s for a $50s^{-1}$ shearing, a silica amount contained in the supernatant of said suspension at 7500 rpm for 30 minutes higher than 50% of the silica weight contained in the suspension.

This suspension is more particularly described in Patent application WO-A-96/01787. The Rhoximat 60 SL silica suspension marketed by RHODIA Chimie is particularly suitable for this concrete type.

Advantageously, the concrete matrix also comprises components able to improve the matrix tenacity, which are selected amongst needle- or platelet-shaped elements the average size of which is 1 mm at the most and being provided in a volume proportion between 2.5% and 35% of the added volume of the granular (b) and pozzolanic (c) elements. The matrix tenacity is preferably at least 15 J/m$^2$, advantageously at least 20 J/m$^2$.

By "cement matrix", it is meant the hardened cement composition, without fibres.

The granular elements are essentially fine sands or blends of fine sands, either sieved or crushed, that can advantageously comprise silica sands, particularly quartz flour.

The maximum size D of these elements is preferably 1 mm or 500 µm at the most.

These granular elements are generally provided in the range of 20% to 60% in weight of the cement matrix, preferably 25% to 50% in weight of said matrix.

The ratio R of the average length L of the fibres to the maximum grain size D of the granular elements is at least 5, particularly when the granular elements have a maximum grain size of 1 mm.

The cement of the composition according to the invention is advantageously a Portland cement such as Portland CPA PMES, HP, HPR, CEM I PMES, 52.5 or 52.5R or HTS (high silica content) cements.

The fine elements with a pozzolanic reaction have an elementary particle size of at least 0.1 µm, and of at most 20 µm, preferably at the most 0.5 µm. They can be selected amongst silicas, such as fly ashes, blast furnace slags, clay derivatives such as china clay. Silica can be a silica smoke from the zirconium industry instead of a silica smoke from the silicon industry.

The water/cement weight percentage of the composition according to the invention may vary when cement substitutes are being used, more particularly pozzolanic reaction elements. The water rate is defined with the weight ratio of the water amount E to the added weight of the cement with the pozzolanic reaction elements: it varies between about 8% and 25% or between 13% and 25%.

The composition according to the invention also comprises a dispersing agent. This dispersing agent is generally a fluidizing agent. The fluidizing agent can be selected amongst lignosulfonates, casein, polynaphthalenes, in particular alkaline metal polynaphthalenesulfonates, formaldehyde derivatives, alkaline metal polyacrylates, alkaline metal polycarboxylates and grafted ethylene polyoxides. In general, the composition according to the invention comprises between 0.5 and 2.5 parts in weight of fluidizing agent for 100 parts in weight of cement.

Other additives can be added to the composition according to the invention, for example, a defoaming agent. Examples can include as defoaming agents particularly polydimethylsiloxane.

Amongst these agent types, it is worth mentioning in particular silicones in the form of a solution, a solid and preferably in the form of a resin, an oil or an emulsion, preferably in water. More particularly suitable are silicones essentially comprising patterns M ($RSiO_{0.5}$) and D ($R_2SiO$). In these formulae, the R radicals, identical or different, are more particularly selected amongst hydrogen and alkyl groups comprising 1 to 8 carbon atoms, the methyl group being preferred. The number of patterns is preferably in the range from 30 to 120.

The amount of such an agent in the composition is generally at the most 5 parts in weight for 100 parts cement.

All the particle sizes are measured using MET (transmission electronic microscopy) or MEB (scanning electronic microscopy).

The concrete is prepared using any well known method by the man skilled in the art, amongst which mixing the solid components and water, shaping (moulding, casting, injection, pumping, extrusion, calendering), and then hardening.

The resulting concrete may be subjected to a cure for a period of time required in order to obtain the desired mechanical features at a temperature from ambient temperature to 100° C., preferably a cure between 60° C. and 100° C. The cure time may range between 6 hours and 4 days with an optimal time being in the order of 2 days, the cure starting after the setting completion of the blend and at least one day after the setting start.

The cure is performed in dry or wet conditions or by cycles alternating both environments, for instance, a 24 hour cure in humid environment followed by a 24 hour cure in dry environment.

This cure is performed on concrete mixes that have completed their setting, preferably at least one day old, and more preferably at least 7 day old approximately.

The addition of quartz powder is particularly useful when the concrete is being cured at a high temperature.

The resulting concrete mixes according to the invention usually exhibit a direct tensile stress strength Rt of at least 6 MPa, with a behaviour having possibly some ductility.

They can also exhibit a 4 point bending strength Rf of at least 20 MPa, a compression strength Rc of at least 140 MPa and a break energy Wf of at least 2000 $J/m^2$.

The tenacity of the cement matrix is obtained particularly by adding to the cement composition reinforcing agents with an anisotropic shape and an average size of 1 mm at the most, preferably 500 $\mu$m at the most.

In general, the reinforcing agents of the composition according to the invention are present with a needle or a platelet shape.

By micro-reinforcing agent "size", it is meant the average size of their largest dimension (more particularly, the length for the needle shapes).

These agents may be natural or synthesis products.

The needle-shaped reinforcing agents may be selected amongst wollastonite fibres, bauxite fibres, mullite fibres, potassium titanate fibres, silicon carbide fibres, phosphate fibres, for example calcium phosphate fibres, more particularly hydroxyapatite (HAP), cellulose (or its derivatives) fibres, carbon fibres, calcium carbonate fibres, (alkali-resistant) glass fibres. Short fibres (length of at the most 2 mm, preferably of at the most 1 mm) of polyvinyl alcohol, polyacrylonitrile, high density polyethylene, polyamide, aramid or polypropylene may also be used. Materials such as steel wool are also included in the definition of the reinforcing agents according to the invention.

The reinforcing agents as platelets may be selected amongst mica platelets, talc platelets, composite silicate platelets (clays), vermiculite platelets, alumina platelets.

It is possible to use a blend of these various forms or types of micro-reinforcing agents in the concrete composition according to the invention.

These reinforcing agents may exhibit on the surface a polymer organic coating obtained from at least one of the following components: polyvinyl alcohol, silanes, siliconates, siloxane resins or polyorganosiloxanes or reaction products between (i) at least one carboxylic acid containing 3 to 22 carbon atoms, (ii) at least one polyfunctional aromatic or aliphatic amine or a substituted amine, containing 2 to 25 carbon atoms and (iii) a cross-linking agent which is a hydrosoluble metal complex, containing at least a metal selected amongst zinc, aluminium, titanium, copper, chromium, iron, zirconium and lead.

The coating thickness may vary between 0.01 $\mu$m and 10 $\mu$m, preferably between 0.1 $\mu$m and 1 $\mu$m.

The latexes may be selected amongst styrene-butadiene latexes, acrylic latexes, styrene-acrylic latexes, methacrylic latexes, carboxylated and phosphonated latexes. The latexes having calcium complexing functions are preferred.

The polymer organic coating can be obtained by treating in a fluid bed or using a mixer of FORBERG type the reinforcing agents in the presence of one of the above-defined compounds.

Preferred compounds include H240 polyorganosiloxane, Rhodorsil 878, 865 and 1830 PX siloxane resins, 403/60/WS and WB LS 14 Manalox, all marketed by RHODIA Chimie, potassium siliconates.

Such a treatment is particularly recommended for reinforcing agents that are natural products.

The concrete can be either pre-stressed in pre-tension with adherent wire or adherent strand or pre-stressed in post-tension either with greased sheathed monostrands or with a sheathed cable or bar, the cable being made either of a wire assembly or of strands.

The pre-stress, either under pre-tension or post-tension form, is particularly well suited to concrete products according to the invention.

The metal pre-stress cables always have very high tensile stress strengths, wrongly used, as the fragility of the matrix containing them does not allow to optimise the dimensions of the concrete structural elements.

An improvement has already been obtained using high performance concrete mixes; in the case of the concrete according to the invention, the material is homogeneously reinforced by organic or hybrid fibres, which allows it to reach high mechanical performances, simultaneously with some ductility. The pre-stress of this material by using cables or strands, whatever its mode is, is then nearly completely used, so creating very resistant tensile and flexural pre-stressed concrete elements and therefore optimized.

The volume reduction obtained as a result of this increase in the mechanical strengths can generate very light prefabricated elements. As a result, the possibility is thus offered to have concrete elements of a large span being easily conveyed due to their light weight; this is particularly well suited for building large works of art where pre-stress in post-tension is widely used. The solution then offers for this work type particularly favorable assembly gains and yard time.

Moreover, the thermal treatment significantly reduces retraction after cure, limiting thereby the pre-stressed losses in the time.

This property is particularly desired and all the above-mentioned advantages, associated to the very low permeability of the product, quite favorable for the durability and maintenance of works of art in the time, make it possible that this material can advantageously substitute for steel works.

The invention also relates to a cement matrix adapted for obtaining and implementing the above-defined concrete.

Finally, the invention relates to pre-blends containing all or part of the components necessary for the preparation of concrete and the matrix as defined here-above.

The following examples illustrate the invention, but without limiting its scope.

SAMPLE PREPARATION

1) Raw Materials

Portland cement: high silica content, HTS type (LAFARGE France)

Sand: BE31 quartz sand (SIFRACO, France)

Quartz flour: C400 grade, 50% of the grains being less than 10 μm (SIFRACO France)

Silica smoke: glass microsilica obtained from the manufacture of zirconium (SEPR France)

Adjuvant: X 404 (MAPEI Italy) or OPTIMA 100 (CHRYSO, France) liquid superplasticizer Fibres: the organic fibres are APV (KURARAY RM182, RF1500 and RF 4000, UNITIKA 1800), PEHD (DSM—Dyneema) or PA (FILTEC PAK 50) fibres. They are present as monostrands with a diameter ranging from 50 μm to 600 μm and a length from 5 to 32 mm. The dosages being used range from 1% to 5% in volume (with respect to the total volume)

Needle-shaped reinforcing agent wollastonite ($CaSiO_3$) NYAD G grade (NYCO USA)

Platelet-shaped reinforcing agent: mica (muscovite) MG 160 grade (KAOLINS D'ARVOR, France).

2) Manufacture Mode

The components are mixed in the following order:

blending matrix pulverulent components and additional components, introducing water and part of the adjuvants, mixing, introducing the remaining fraction of fluidizing agents, mixing, introducing the reinforcing fibres, mixing.

The mixing duration is strongly dependent upon the mixer type being used (EIRICH or HOBART).

The outgassing can be made easier by mixing at reduced speed at the end of the process.

The moulds are then filled and vibrated according to the usual procedures.

3) Cure

Maturing at 20° C. The test specimens are released 48 hours after casting. They are then subjected to a treatment consisting in storing them under water at approximately 20° C. for at least 14 days. The test specimens are machined (depending on the trial to be performed) 26 to 28 days after casting and the trial is performed in the following days.

Thermal treatment at 90° C. The test specimens are released 48 hours after casting. They are then subjected to a thermal treatment consisting in storing them in an oven at 90° C. for 24 hours in wet air (>90° C. RH), followed by 24 hours in dry air. The machining is performed 6 days after casting and the trial is carried out the following days (7 days minimum after casting).

MEASURING METHODS

Direct Tensile Stress Behaviour: Rt

This is the value obtained in direct tensile stress on dumbbell-shaped test specimens machined from 70×70×280 mm prisms in order to have a useful section being 70×50 mm² by 50 mm high. The test specimens, carefully aligned, are rigidly mounted on the testing bank (UTS) with a single freedom degree (no link with knee cardan type articulation).

$$Rt = \frac{F\max}{70 \times 50}$$

where Fmax represents the maximum strength in N (peak) for a breaking occurring in the 70×50 central section.

Ductility coefficient: δ

The ductility coefficient δ is defined by the relationship:

$$\delta \frac{\epsilon_A \cdot \sigma_B}{\epsilon_B \cdot \sigma_A}$$

if $\sigma_A \geq \sigma_B$ where $\epsilon_A$ is the deformation at peak, and $$\epsilon_{el} = \epsilon_B \cdot \frac{\sigma_A}{\sigma_B}$$

is the strain that would be obtained under the peak stress by elastically extrapolating the strain obtained under the running stress.

Bending Behaviour: Rf i) 4 point bending

Rf is the value obtained in 4 point bending (distance between axles: 70×210) on 70×70×280 mm prismatic test specimens mounted on knee-shaped bearings.

$$Rf = \frac{3F\max(l - l')}{2dw^2}$$

where Fmax represents the maximal strength in N (strength at peak), l=210 mm and l'=⅓ and d=w=70 mm.

ii) 3 point bending

The value obtained in 3 point bending Rf (distance between axles: 200) is obtained on 40×40×250 mm prismatic test specimens mounted on knee-shaped bearings.

$$Rf = \frac{3Fmwl}{2dw^2}$$

where Fmax represents the maximal strength in N (strength at peak), l=200 mm and d=w=40 mm.

Compressive Behaviour: Rc

Rc is the value obtained in direct compression on a rectified cylindrical sample (diameter 70 mm/height 140 mm).

$$Rc = \frac{4F}{\pi d^2}$$

where F represents the breaking strength in N and d the sample diameter (70 mm).

Tenacity: Kc, Gc

The tenacity is expressed either in terms of stress (critical stress intensity factor: Kc) or in terms of energy (energy critical rate: Gc), using the formalism of the Break Linear Mechanics.

The trials are performed in 3 point bending from notched 40×40×250 or 70×70×280 mm prisms, i.e. SENB geometry samples (ASTM-E 399-83 Method). A V-profiled notch is dry made on these prisms, using a milling machine provided with a diamond disc. The relative depth a/w of the notch is 0.4 (a: notch depth, w: sample height).

The stress intensity critical factor Kc is obtained from the breaking load F and the crack length a at the instability point (servo moving test, at $10^{-2}$ mm/s, on SCHENCK universal test machine:

$$Kc = \frac{3Fl}{2dw^2}\sqrt{aY}$$

where:
- l represents the distance between axles between supporting points (bending bench):=210 mm,
- d and w are respectively the depth and the height of the sample,
- a is the length notch during breaking,
- Y is a shape parameter depending on the crack length ($\alpha=a/w$). In 3 point bending, the Y parameter according to SRAWLEY J. E (International J. of Fracture (1976), vol. 12, pp. 475–476) is preferably used:

$$Y = \frac{1.99 - \alpha(1-\alpha)(2.15 - 3.93\alpha + 2.7\alpha^2)}{(1+2\alpha)(1-\alpha)^{3/2}}$$

Gc can be obtained from the strength-shift curves on the condition that the contributions due to interference strains are extracted and that the dissipated energy is reported to the ligament section: (w–a)×d.

In planar strain, there is a simple relationship between Kc and Gc:

$$Gc = \frac{Kc^2(1-v^2)}{E}$$

where:
- E is the elastic modulus,
- v represents the Poisson's coefficient.
- E is experimentally obtained by vibrating a prismatic sample bearing on two supports from the fundamental frequency determination (GRINDO-SONIC method).

Breaking Energy: Wf

Wf is the value obtained in determining the total area under the force-sag curve, upon a 4 point bending trial on 70×70×280 mm prisms. The measured sag is corrected in order to determine the real sample shift.

$$Wf = \frac{\int F\delta c}{dw}$$

where F is the force being applied, δc is the real shift (corrected sag), d×w the sample section.

Adherence

As to the organic fibre adherence in the cement matrix, the stress is determined by an extraction test for a monofibre embedded in a concrete block.

The wires are embedded in concrete blocks the dimensions of which are 4×4×4 cm. The composition being used is the same as that used for the test specimens in the mechanical trial (bending, compression and tension): the water/cement ratio is set at 0.25.

The wires embedded in a length of 10 mm are extracted by tension using a universal test machine (SCHENCK) with a speed of 0.1 mm/min.

The stress being exerted is measured by means of an adapted force sensor and the wire shift (with respect to the sample) by means of an extensometry sensor.

The average adherence stress is evaluated from the following simplified formula:

$$\tau_d = \frac{Fmax}{\pi \phi l_e}$$

where Fmax is the maximum force being measured, $\phi$ the wire diameter and $I_e$ the embedding length.

EXAMPLES

Fibre concrete mixes are produced using the fibres defined in the following tables I to VI, the compositions of these concrete mixes being defined in the following tables II to VI. These compositions are based in weight.

The performances of said concrete mixes are indicated in the following tables II to V, as well as on FIGS. 2 to 14.

In the figures:

FIG. 1 is a typical direct tensile stress curve of a concrete mix with a ductile nature.

FIG. 2 is a graph obtained by 4 point bending trials with in ordinate, the stress values (MPa) and in abscissa, the values of the sag (mm) for concrete samples, with a E/C ratio=0.2 and a maturation at 20° C. (28 days): comparison of the steel fibres (Steel Cord) and the organic fibres (APV).

FIG. 3 is a graph obtained by 4 point bending trials with in ordinate, the stress values (MPa) and in abscissa, the values of the sag (mm) for concrete samples, with a E/C ratio=0.2 and a thermal treatment at 90° C.: comparison of the steel fibres (Steel Cord) and the organic fibres (APV).

FIG. 4 shows a graph obtained by direct tensile stress tests with, in ordinate, the stress values (MPa) and in abscissa, the elongation values (mm) for concrete samples, with a E/C ratio=0.2 and a maturation at 20° C. (28 days): organic fibres (APV).

FIG. 5 shows a graph obtained by direct tensile stress tests with, in ordinate, the stress values (MPa) and in abscissa, the elongation values (mm) for concrete samples, with a E/C ratio=0.2 and a thermal treatment at 90° C.: organic fibres (APV).

FIG. 6 shows a graph obtained by direct tensile stress tests with, in ordinate, the stress values (MPa) and in abscissa, the elongation values (mm) for wollastonite-containing concrete samples, with a E/C ratio=0.24 and a maturation at 20° C. (28 days): organic fibres (APV).

The ductility criterion 6 has varied from 3 to 5 approximately.

FIG. 7 is a graph obtained by 3 point bending trials with, in ordinate, the force (N) and in abscissa, the values of the shift (mm) for concrete samples, with a E/C ratio=0.25 and a thermal treatment at 90° C.: APV RF 1500 fibres.

FIG. 8 is a graph obtained by 3 point bending trials with, in ordinate, the force (N) and in abscissa, the values of the shift (mm) for concrete samples, with a E/C ratio=0.25 and a thermal treatment at 90° C.: APV RF 1500 fibres of different length (10 mm to 30 mm).

FIG. 9 is a graph obtained by 3 point bending trials with, in ordinate, the force (N) and in abscissa, the values of the shift (mm) for concrete samples, with a E/C ratio=0.25 and a thermal treatment at 90° C.: PEHD fibres.

FIG. 10 is a graph obtained by 3 point bending trials showing the effect of a blend of APV organic fibres (2% vol. of RF 1500 and 2% vol. of RF 4000) in a concrete matrix with a E/C ratio=0.25 and a thermal treatment at 90° C. for 48 hours.

Figure 11:
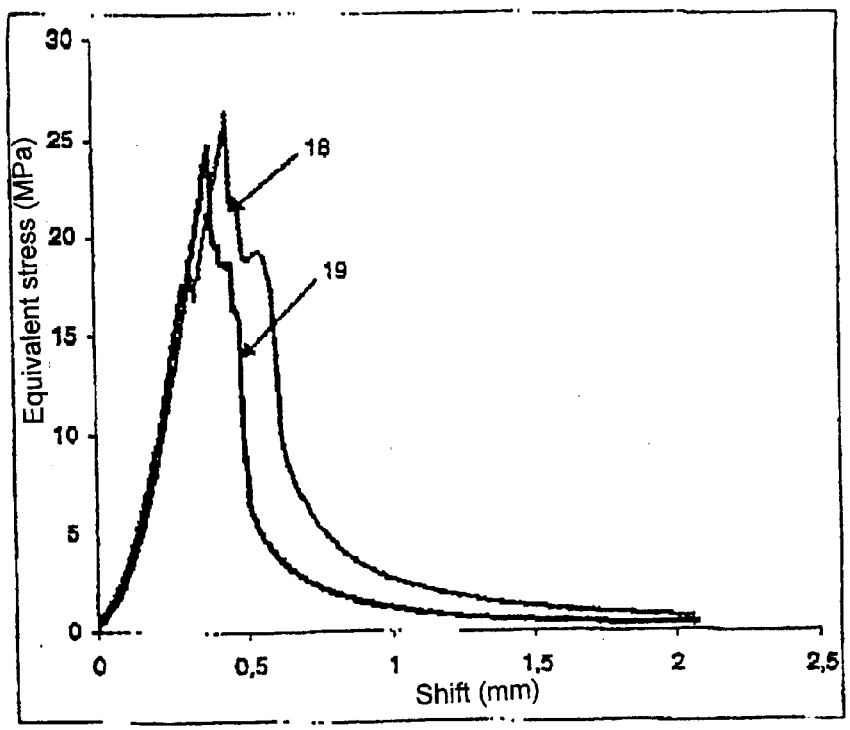

FIG. 11 is a graph representing the stress/shift curves obtained in 3 point bending trials with compositions 18 and 19 with the PEHD fibres in table V.

Figure 12:
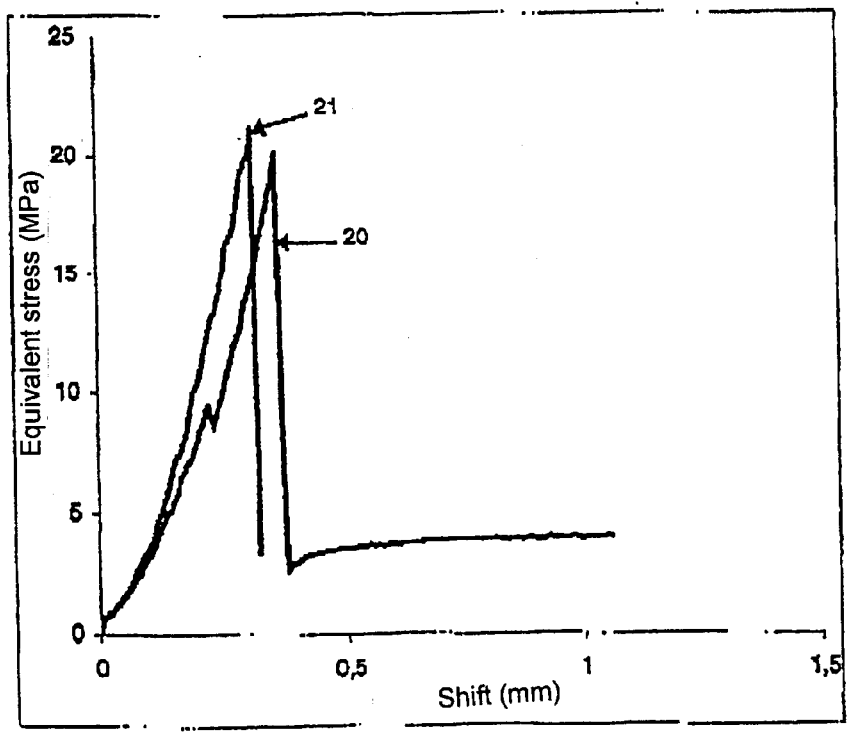

FIG. 12 is a graph similar to that of FIG. 11 obtained with compositions 20 and 21 with the PA fibres in table V.

Figure 13:
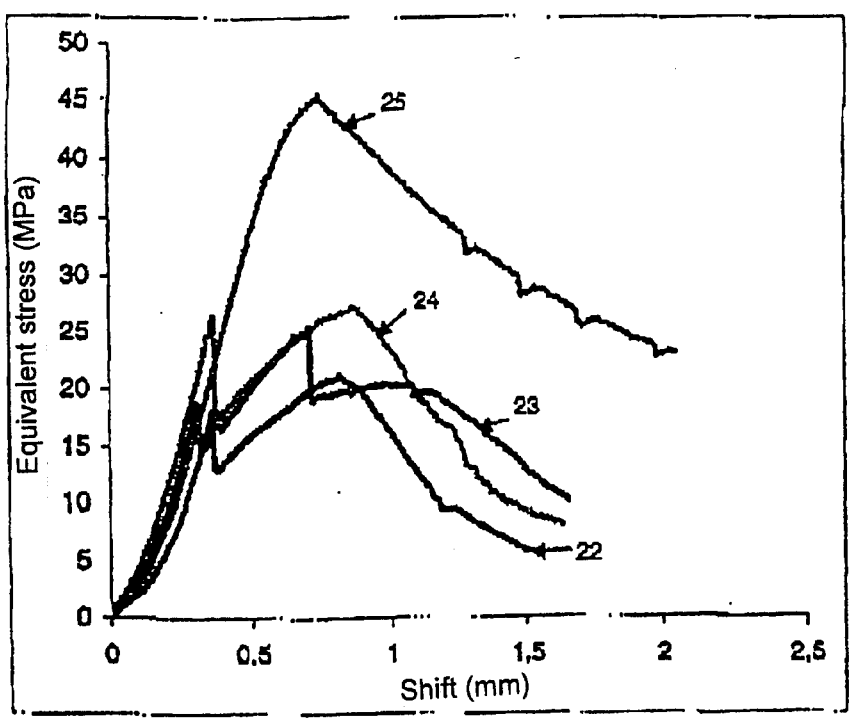

FIG. 13 is a graph similar to that of FIG. 11 and 12 obtained with compositions 22, 23 and 24 with APV fibres and 25 with APV/steel hybrids in table V.

Figure 14:
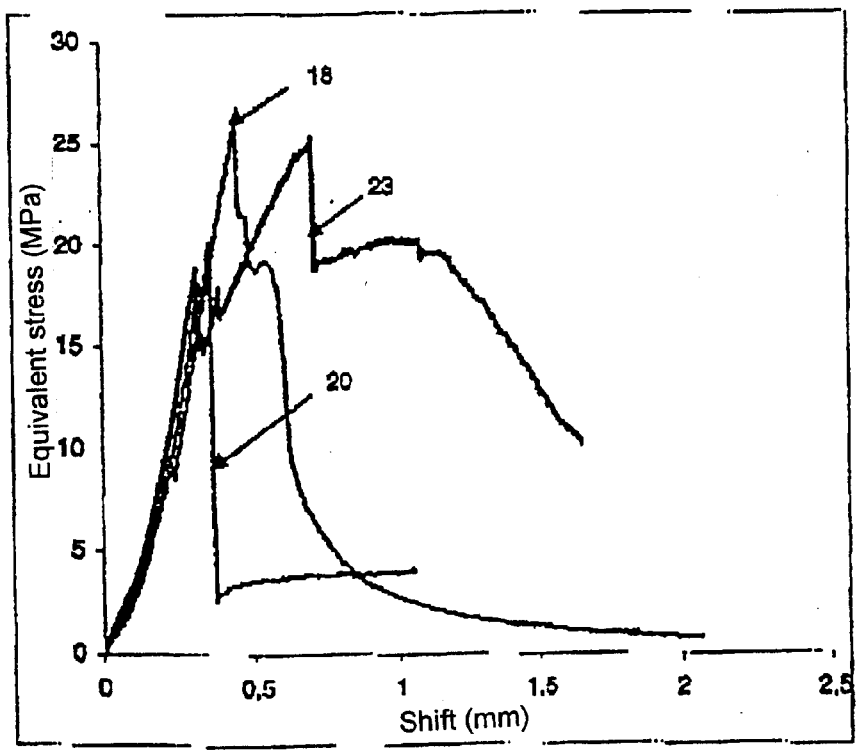

FIG. 14 is a graph similar to that of FIG. 11 to 13 for comparing the behaviours of fibres of different types according to compositions 18 (PEHD), 20 (PA) and 23 (APV) in table V.

Figure 15:
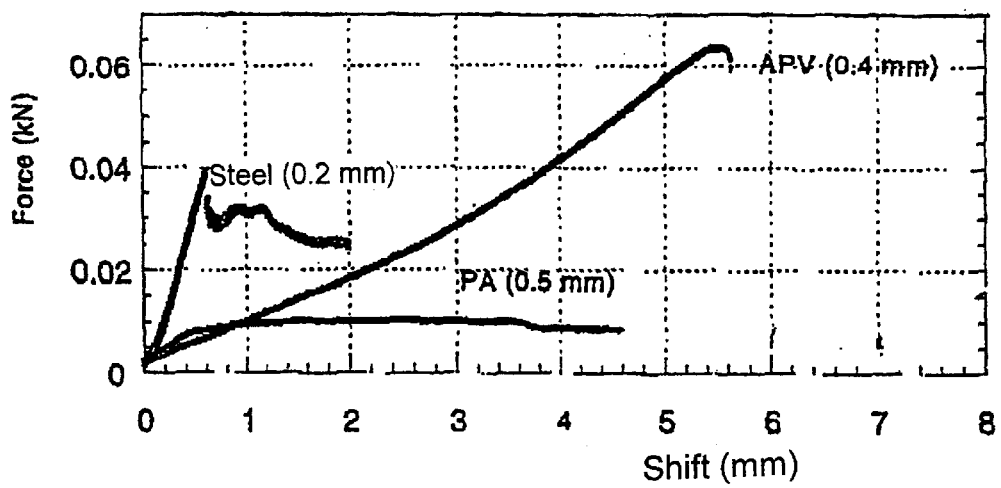

FIG. 15 is a graph illustrating the results obtained in the monofibre pull-out tests with various fibre types, with in ordinate, the force being applied and in abscissa, the shift, with the matrix of the composition indicated in table VI.

The results obtained in 3 point bending in examples 18 to 25 correspond to trials performed using a 120 mm distance between axles on 40×40×160 mm prismatic test specimens.

The reinforcing effect generated by fibres dispersed in a concrete matrix is clearly enhanced through (4 point) bending trials: FIGS. 2 and 3. The polyvinyl alcohol fibres (APV) incorporated at a rate of 4% vol. lead to a behaviour similar to that obtained with steel cord dispersion (2% vol.). The thermal treatment (90° C.) develops some reactivity between the APV fibres and the concrete matrix: hence, a high peak stress observed in (4 point) bending.

In direct tension stress (FIGS. 4 and 5), an important cold working effect (ductility) is observed in the presence of 4% vol. polyvinyl alcohol fibres (APV): an important multi-cracking is observed on the tensile stress test specimens. This phenomenon is not observed in the case of steel cords because of their high rigidity and the average adherence of such fibres in the concrete matrix. The peak value is substantially improved in the case of a 90° C. thermal treatment.

Similar behaviours are observed in the case of APV fibres dispersed in a wollastonite-containing matrix (FIG. 6), with the first damage stress increase.

In the presence of organic fibres, the concrete mixes tested in 3 point bending show a high ductility: high cold working until the peak stress, post-peak dissipated energy. This is observed both for APV polyvinyl alcohol fibres (FIG. 7) and for PEHD high density polyethylene fibres (FIG. 9).

The fibre length must be optimised: compromise between rheology and mechanical properties. For example, for APV fibres having approximately a 400 $\mu$m diameter, it has been observed in 3 point bending that there is a transition regarding the fibre length towards 18 mm approximately (FIG. 8). This gives a elongation factor in the order of 50.

The advantage of a fibre blend is illustrated in FIG. 10. It has been observed in the one hand that APV fibres of average dimensions (KURARAY 1500: 4% vol.) lead to a bending strength gain (peak stress) of the concrete: on the other hand, higher dimension APV fibres (KURA Y 4000: 4% vol.) induce an important energy dissipation in bending (post-peak portion), but to the detriment of the resistance (peak stress). A combination of the two fibre types surprisingly allows to obtain a reinforced concrete having (for instance in bending) both an improvement of the bending resistance (peak stress) and of the dissipated energy (ductility): (FIG. 10).

Effects for this purpose can be developed by an hybrid reinforcement: combination of organic fibres and metal fibres.

The invention is not limited to the embodiments that have been described.

It also encompasses the concrete mixes that, besides the claimed compositions or equivalent compositions, would comprise additional constituents which would not prevent the claimed compositions or equivalent compositions from producing the expected effects and premixes comprising all or part of the components necessary to the preparation of the concrete matrix.

TABLE I

Features of the studied organic fibres

|  | Density | Module E (Gpa) | Mechanical strength (Mpa) | Breaking elongation (%) | Diameter ($\mu$m) | Length (mm) | Melting point (° C.) |
|---|---|---|---|---|---|---|---|
| APV | 1.3 | 20–30 | 800–1200 | 7–10 |  |  | 220 |
| RM182 |  |  |  |  | 15 | 6 |  |
| RF350 |  |  |  |  | 200 | 12 |  |
| RF1500 |  |  |  |  | 400 | 20/30 |  |
| RF4000 |  |  |  |  | 600 | 30 |  |
| PEHD | 0.97 | 90 | 2700 | 3–5 |  |  | 150 |
|  |  |  |  |  | 50 | 5 |  |
|  |  |  |  |  | 50 | 10 |  |
|  |  |  |  |  | 50 | 18 |  |

TABLE I-continued

Features of the studied organic fibres

| | Density | Module E (Gpa) | Mechanical strength (Mpa) | Breaking elongation (%) | Diameter ($\mu$m) | Length (mm) | Melting point (° C.) |
|---|---|---|---|---|---|---|---|
| PA | 1.12 | 2–5 | 500–900 | 20–30 | | | 260 |
| | | | | | 500 | 20 | |
| | | | | | 500 | 30 | |
| Steel | 7.6 | 210 | 2900 | | 200 | 13 | 1550 |

TABLE II

Evaluation of the mechanical performances of fibre concrete mixes: comparison APV fibres/steel fibres

| Example no. | 1 | 2 | 3 | 4 | 5 | 6 | 7 | 8 |
|---|---|---|---|---|---|---|---|---|
| Portland cement | 1 | 1 | 1 | 1 | 1 | 1 | 1 | 1 |
| Sand | 1.430 | 1.430 | 1.430 | 1.430 | 1.430 | 1.430 | 1.29 | 1.29 |
| Quartz flour | 0.300 | 0.300 | 0.300 | 0.300 | 0.300 | 0.300 | 0.300 | 0.300 |
| Silica smoke | 0.325 | 0.325 | 0.325 | 0.325 | 0.325 | 0.325 | 0.325 | 0.325 |
| Adjuvant (dry extract) | 0.012 | 0.012 | 0.012 | 0.012 | 0.012 | 0.012 | 0.015 | 0.015 |
| Water | 0.200 | 0.200 | 0.24 | 0.24 | 0.20 | 0.20 | 0.24 | 0.24 |
| Fibres: type | Without | Without | Steel | Steel | APV | APV | APV | APV |
| Fibres: % vol. | | | 2% | 2% | 4% | 4% | 4% | 4% |
| Wollastonite | 0 | 0 | 0 | 0 | 0 | 0 | 10 | 10 |
| Mica | 0 | 0 | 0 | 0 | 0 | 0 | 0 | 0 |
| Maturing or thermal treatment (T in ° C.) | 20 | 90 | 20 | 90 | 20 | 90 | 20 | 90 |
| 4 point bending strength | 16.6 | 16.5 | 18.5 | 21.3 | 23 | 27.5 | 22 | 27 |
| Tensile strength (Mpa) | 7.1 | 6.75 | 7.75 | 10.75 | 9 | 8.5 | 9.25 | 9.45 |
| Tenacity Gc (J/m$^2$) | 9.2 | 10 | 10 | 10.5 | 9.75 | 10.25 | 20 | 22 |
| Compression strength | 190 | 198 | 155 | 182.5 | 138 | 147.5 | 143 | 147 |
| Dissipated energy Wf (J/m$^2$) | 12 | 15 | >5000 | >5000 | >5000 | >5000 | >5000 | >5000 |

Fibre type: APV = polyvinyl alcohol

TABLE III

Evaluation of the mechanical performances obtained with different organic fibres

| Example no. | 9 | 10 | 11 | 12 | 13 |
|---|---|---|---|---|---|
| Portland cement | 1 | 1 | 1 | 1 | 1 |
| Sand | 1.430 | 1.430 | 1.430 | 1.430 | 1.430 |
| Quartz flour | 0.300 | 0.300 | 0.300 | 0.300 | 0.300 |
| Silica smoke | 0.325 | 0.325 | 0.325 | 0.325 | 0.325 |
| Adjuvant (dry extract) | 0.01 | 0.01 | 0.01 | 0.01 | 0.01 |
| Water | 0.25 | 0.25 | 0.25 | 0.25 | 0.25 |
| Fibres: type | APV 1500 | APV 4000 | APV 1800 | PEHD | PAN |
| Fibres: % vol. | 4 | 4 | 4 | 1 | 1.5 |
| Maturing or thermal treatment (T in ° C.) | 90 | 90 | 90 | 90 | 90 |
| 3 point bending strength (Mpa) | 35 | 27 | 25 | 22.5 | 20 |
| Tenacity Gc (J/m$^2$) | 10 | 10 | 11.25 | 11 | 10 |
| Compression strength (Mpa) | 142 | 145 | | 152.5 | 145 |

APV fibre type = KURARAY (1500, 4000), UNITIKA (1800) polyvinyl alcohol
PEHD = high density polyethylene
PAN = polyacrylonitrile

TABLE IV

APV (1500) fibres: effect of the fibre length

| Example no. | 14 | 15 | 16 | 17 |
|---|---|---|---|---|
| Portland cement | 1 | 1 | 1 | 1 |
| Sand | 1.430 | 1.430 | 1.430 | 1.430 |
| Quartz flour | 0.300 | 0.300 | 0.300 | 0.300 |
| Silica smoke | 0.325 | 0.325 | 0.325 | 0.325 |
| Adjuvant (dry extract) | 0.01 | 0.01 | 0.01 | 0.01 |
| Water | 0.25 | 0.25 | 0.25 | 0.25 |
| Fibres: length (mm) | 30 | 18 | 12 | 6 |
| Fibres: % vol. | 4 | 4 | 4 | 4 |
| Maturing or thermal treatment (T in ° C.) | 90 | 90 | 90 | 90 |
| 3 point bending strength (MPa) | 35 | 30 | 16.5 | 12 |
| Compression strength (MPa) | 145 | 152 | 132.5 | 135 |
| Breaking type | Ductile | Ductile | No cold working | Semi-breakable |

TABLE V

| Example no. | 18 | 19 | 20 | 21 | 22 | 23 | 24 | 25 | |
|---|---|---|---|---|---|---|---|---|---|
| Portland cement | 1 | 1 | 1 | 1 | 1 | 1 | 1 | 1 | |
| Silica smoke | 0.325 | 0.325 | 0.325 | 0.325 | 0.325 | 0.325 | 0.325 | 0.325 | |
| Quartz flour | 0.3 | 0.3 | 0.3 | 0.3 | 0.3 | 0.3 | 0.3 | 0.3 | |
| Sand | 1.43 | 1.43 | 1.43 | 1.43 | 1.43 | 1.43 | 1.2 | 1.43 | |
| Wollastonite | — | — | — | — | — | — | 0.24 | — | |
| Adjuvant (dry extract) | 0.018 | 0.018 | 0.018 | 0.018 | 0.019 | 0.017 | 0.018 | 0.018 | |
| Water (E/C) | 0.25 | 0.25 | 0.22 | 0.22 | 0.19 | 0.21 | 0.21 | 0.25 | |
| Fibres: type | PEHD | PEHD | PA | PA | APV | APV | APV | APV | Steel |
| Fibres: length (mm) | 5 | 10 | 20 | 30 | 12 | 20 | 20 | 6 | 13 |
| Fibres: diameter (mm) | 0.05 | 0.05 | 0.5 | 0.5 | 0.2 | 0.4 | 0.4 | 0.015 | 0.2 |
| Fibres: % vol. | 1.5 | 1 | 5 | 5 | 4 | 4 | 4 | 1 | 2 |
| Thermal treatment (T in ° C.) | 90 | 90 | 90 | 90 | 90 | 90 | 90 | 90 | |
| 3 point bending strength 40 × 40 × 160 mm | 26.5 | 24.6 | 20.4 | 21.3 | 20.5 | 24.9 | 27.9 | 44.0 | |
| Compression strength MPa | 121 | 185 | 122 | 139 | 150 | 137 | 140 | 178 | |

TABLE VI

| Composition of the matrix used for the pull-out tests | |
|---|---|
| Portland cement | 1 |
| Sand | 1.43 |
| Quartz flour | 0.3 |
| Silica smoke | 0.325 |
| Adjuvant (dry extract) | 0.018 |
| E/C | 0.25 |
| Maturing or thermal treatment (T in ° C.) | 90 |

What is claimed is:

1. A concrete comprising a hardened cement matrix in which organic fibres are dispersed, obtained by blending with water a composition comprising besides organic fibres:
   (a) cement,
   (b) granular elements,
   (c) fine elements with a pozzolanic reaction,
   (d) at least one dispersing agent, and wherein:
     (1) the granular elements (b) have a maximum grain size D of 2 mm at the most,
     (2) the fine elements with a pozzolanic reaction (c) have a particle size of 20 μm at the most,
   and wherein:
     (3) the weight percentage of water to the added weight of cement (a) and the fine pozzolanic reaction elements (c) is in the range between 8% and 25%,
     (4) the organic fibres have an individual length I of at least 2 mm and a I/Φ ratio of at least 20, Φ being the fibre diameter,
     (5) the fibre amount is such that their volume represents 8% at the most of the concrete volume after setting,
     (6) the ratio R between the average fibre length L and the maximum grain size D of the granular elements is at least 5.

2. A concrete comprising a hardened cement matrix in which organic fibres are dispersed, obtained by blending with water a composition comprising besides organic fibres:
   (a) cement,
   (b) granular elements,
   (c) fine elements with a pozzolanic reaction,
   (d) at least one dispersing agent, and wherein:
     (1) the fine elements with a pozzolanic reaction have a particle size of 1 μm at the most, and also wherein:
     (2) the weight percentage of water to the weight of cement (a) and the fine elements with a pozzolanic reaction (c) is in the range between 8% and 24%,
     (3) the organic fibres have an individual length I of at least 2 mm and a I/Φ ratio, Φ being the fibre diameter,
     (4) the fibre amount is such that their volume is 8% at the most of the concrete after setting,
     (5) the whole elements (a), (b) and (c) have a grain size D75 of 2 mm at the most and a grain size D50 of 150 μm at the most and
     (6) the ratio R between the average fibre length L and the grain size D75 of all the elements (a), (b) and (c) is at least 5.

3. The concrete according to claim 1, wherein the concrete has, in direct tensile stress, a ductility, given in terms of ductility coefficient δ, δ>1.

4. The concrete according to claim 1, wherein the organic fibres are selected from the group consisting of polyvinyl alcohol fibres, polyacrylonitrile fibres, polyethylene fibres, polyethylene fibres, polyamide fibres, polyimide fibres, polypropylene fibres, aramid fibres, carbon fibres and combinations thereof.

5. The concrete according to claim 1, wherein the I/Φ ratio of the fibres is at the most 500.

6. The concrete according to claim 1, wherein the average adherence stress of the fibres in the hardened cement matrix is at least 2 MPa.

7. The concrete according to claim 1, wherein the cement matrix further comprises at least one compound, the function of which is to increase the fibre adherence in the matrix, the compound selected from the group consisting of silica compounds, precipitated calcium carbonate, polyvinyl alcohol in aqueous solution, phosphates, latexes, a defoaming agent and combinations thereof.

8. The concrete according to claim 7, wherein the silica compound is a precipitated silica introduced in a content ranging from 0.1% to 5% in weight, based in dry conditions, with respect to the total concrete weight.

9. The concrete according to claim 8, wherein the precipitated silica is introduced into the composition as an aqueous suspension.

10. The concrete according to claim 1, wherein a portion of the organic fibres is substituted for by metal fibres, the metal fibres having an individual length I of at least 2 mm and a I/Φ elongation ratio of at least 20, φ being the fibre diameter.

11. The concrete according to claim 10, wherein the concrete comprises a combination of organic fibres and metal fibres.

12. The concrete according to claim 1, wherein the concrete further comprises elements that improve the matrix tenacity, which are either needle-shaped elements or platelet-shaped elements, the average size thereof being 1 mm at the most and being provided in a volume proportion between 2.5% and 35% of the added volume of the granular elements (b) and the pozzolanic reaction elements (c).

13. The concrete according to claim 12, wherein the cement has a matrix tenacity of at least 15 J/m$^2$.

14. The concrete according to claim 1, wherein the concrete has a matrix tenacity obtained through addition to the cement composition of reinforcing agents with an anisotropic shape and an average size of 500 µm at the most.

15. The concrete according to claim 14, wherein the reinforcing agents are provided in a volume proportion ranging from 5% to 25% of the added volume of the granular elements (b) and the pozzolanic reaction elements (c).

16. The concrete according to claim 12, wherein the needle-shaped reinforcing agents are selected from the group consisting of wollastonite fibres, bauxite fibres, mullite fibres, potassium titanate fibres, silicon carbide fibres, cellulose fibres or their derivatives, carbon fibres, calcium phosphate fibres, calcium carbonate fibres, glass fibres or their derivatives, polyvinyl alcohol fibres, polyacrylonitrile fibres, polyethylene fibres, polyamide fibres, aramid fibres, polypropylene fibres, steel wool and combinations thereof.

17. The concrete according to claim 12, wherein the platelets are selected from the group consisting of mica platelets, talc platelets, composite silicate platelets, vermiculite platelets, alumina platelets, aluminate platelets and combinations thereof.

18. The concrete according to claim 14, wherein at least a portion of the anisotropic reinforcing agents have on the surface a polymer organic coating selected from the group consisting of polyvinyl alcohol, silanes, siliconates, siloxane resins, polyorganosiloxanes and a reaction product between (i) at least a carboxylic acid containing 3 to 22 carbon atoms, (ii) at least a polyfunctional aromatic or aliphatic amine or a substituted amine, containing 2 to 25 carbon atoms and (iii) a cross-linking agent which is a hydrosoluble metal complex, containing at least a metal selected from the group consisting of zinc, aluminum, titanium, copper, chromium, iron, zirconium and lead.

19. The concrete according to claim 1, wherein the size of the granular elements (b) is at the most 500 µm.

20. The concrete according to claim 1, wherein the granular elements (b) are fine sands or blends of fine sands and either sieved or crushed sands.

21. The concrete according to claim 1, wherein said granular elements (b) are provided in the range of 20% to 60% in weight of the cement matrix.

22. The concrete according to claim 1, wherein the pozzolanic reaction fine elements (c) comprise elements selected from the group consisting of silica, fly ash, blast furnace slag and combinations thereof.

23. The concrete according to claim 1, wherein the water percentage based on the added weight of cement (a) and pozzolanic reaction elements (c) is in the range between 13% and 25%.

24. The concrete according to claim 1, wherein the concrete has a direct tensile stress strength of at least 6 MPa.

25. The concrete according to claim 1, wherein the concrete has a 4 point bending resistance of at least 20 MPa.

26. The concrete according to claim 1, wherein the concrete has a compression resistance of at least 120 MPa.

27. The concrete according to claim 1, wherein the concrete has a breaking energy of at least 2000 J/m$^2$.

28. The concrete according to claim 1, wherein the concrete, after setting, is subjected to a maturing at a temperature close to ambient temperature.

29. The concrete according to claim 1, wherein the concrete, after setting, is subjected to a thermal treatment between 60° C. and 100° C.

30. The concrete according to claim 29, wherein the duration of the thermal treatment is from 6 hours to 4 days.

31. The concrete according to claim 1, wherein the concrete is pre-stressed in pre-tension.

32. The concrete according to claim 1, wherein the concrete is pre-stressed in post-tension.

33. A premix comprising the required components for the preparation of the concrete according to claim 1.

* * * * *